(12) United States Patent
Chen et al.

(10) Patent No.: US 8,118,377 B2
(45) Date of Patent: Feb. 21, 2012

(54) COMPUTER ENCLOSURE

(75) Inventors: Yun-Lung Chen, Taipei Hsien (TW); Zhi-Qiang Li, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 298 days.

(21) Appl. No.: 12/485,288

(22) Filed: Jun. 16, 2009

(65) Prior Publication Data
US 2010/0223761 A1 Sep. 9, 2010

(30) Foreign Application Priority Data
Mar. 6, 2009 (CN) .............................. 200920301106

(51) Int. Cl.
A47B 81/00 (2006.01)
(52) U.S. Cl. ................... 312/223.2; 312/263; 312/319.1
(58) Field of Classification Search ............... 312/223.2, 312/263, 265.5–265.6, 319.1; 361/679.58, 361/726; 292/32, 33, 34, 37, 40, 42, 137, 292/169, 171, 173, 175, 140, 141, 143, DIG. 11
See application file for complete search history.

(56) References Cited

U.S. PATENT DOCUMENTS

| | | | | |
|---|---|---|---|---|
| 6,669,243 B2* | 12/2003 | Katoh et al. | ................... | 292/34 |
| 6,721,183 B1* | 4/2004 | Chen et al. | ................... | 361/726 |
| 6,932,447 B2* | 8/2005 | Chen et al. | ................. | 312/223.2 |
| 7,208,686 B1* | 4/2007 | Chen et al. | ................... | 174/561 |
| 7,252,351 B2* | 8/2007 | Chen et al. | ................. | 312/223.2 |
| 7,265,986 B2* | 9/2007 | Chen et al. | ................... | 361/726 |
| 7,428,146 B2* | 9/2008 | Han | ....................... | 361/679.55 |
| 7,539,010 B2* | 5/2009 | Chen et al. | ............... | 361/679.55 |
| 7,874,627 B2* | 1/2011 | Hsiao et al. | ............... | 312/223.2 |
| 2005/0023943 A1* | 2/2005 | Fan et al. | ................. | 312/223.2 |
| 2007/0206348 A1* | 9/2007 | Lin | .............................. | 361/683 |
| 2008/0225475 A1* | 9/2008 | Zhang et al. | .................. | 361/683 |

* cited by examiner

*Primary Examiner* — Hanh V Tran
(74) *Attorney, Agent, or Firm* — Altis Law Group, Inc.

(57) ABSTRACT

A computer enclosure includes a chassis, a cover detachably mounted to the chassis, and a rotary member pivotably attached to the cover. The chassis includes at least one assembly slot defined therein. A sliding member is slidably installed in the cover. At least one hook is formed on the sliding member and engaged in the assembly slot of the chassis. The rotary member is capable of being rotated to drive the sliding member to slide in the cover, thereby disengaging the hook from the assembly slot.

7 Claims, 6 Drawing Sheets

COMPUTER ENCLOSURE

BACKGROUND

1. Technical Field

The present disclosure relates to a computer enclosure with a cover mountable thereon and removable therefrom.

2. Description of Related Art

A frequently used computer enclosure includes a chassis and a cover mounted to the chassis. The chassis includes a pair of parallel side panels, each defining a plurality of slots defined therein. The cover forms a plurality of hooks on opposite edges corresponding to the slots of the side panels. In assembly, the hooks of the cover are received in the slots of the side panels, and some fasteners, such as screws, engage mounting holes defined in the chassis and the cover. Thus, the cover is mounted to the chassis. However, it is complicated to mount or remove the cover.

What is needed, therefore, is a computer enclosure with a cover conveniently mounted thereon and removed therefrom.

DETAILED DESCRIPTION

Figure 1:
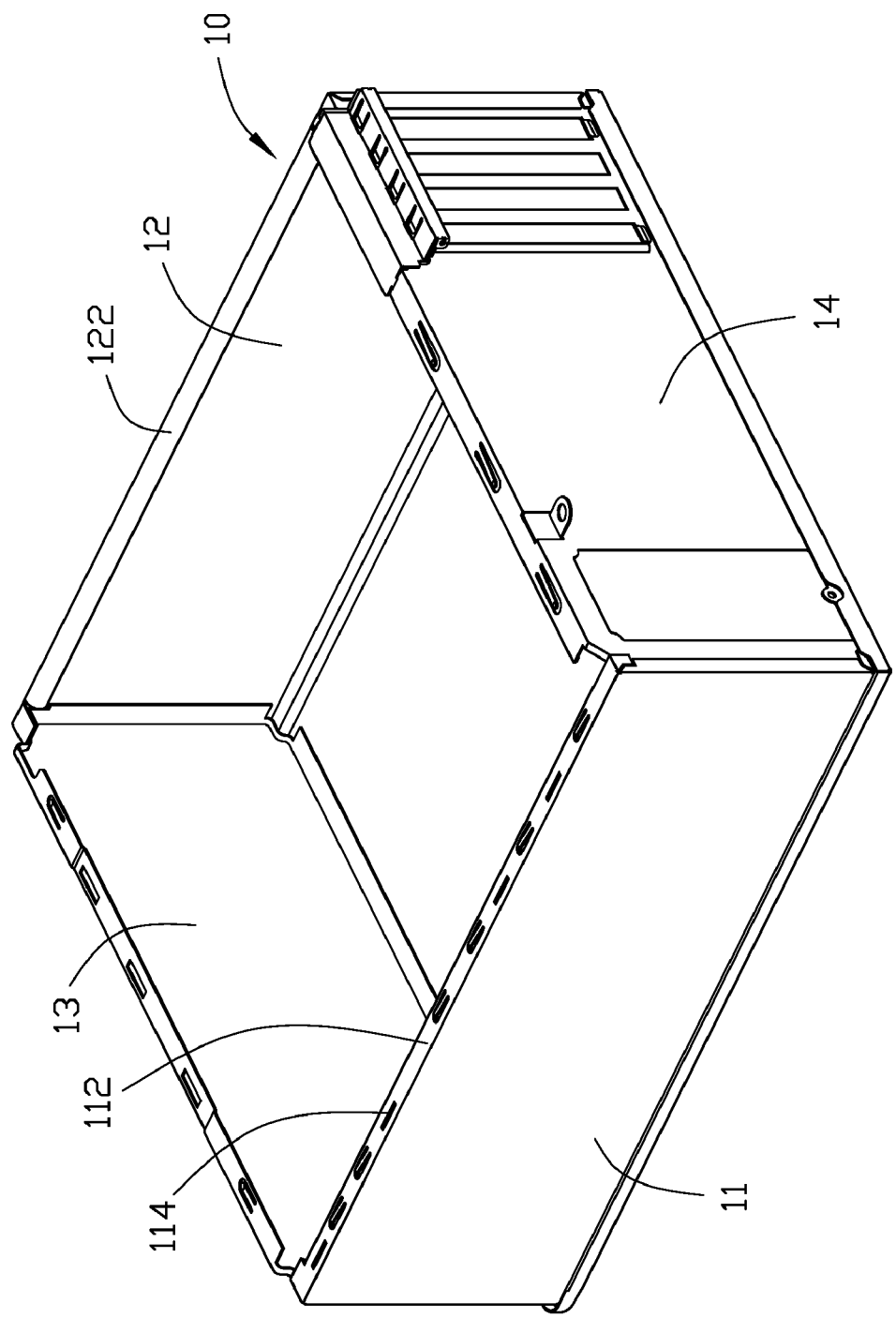
FIG. 1 is an isometric view of a chassis of an embodiment of a computer enclosure.
Figure 2:
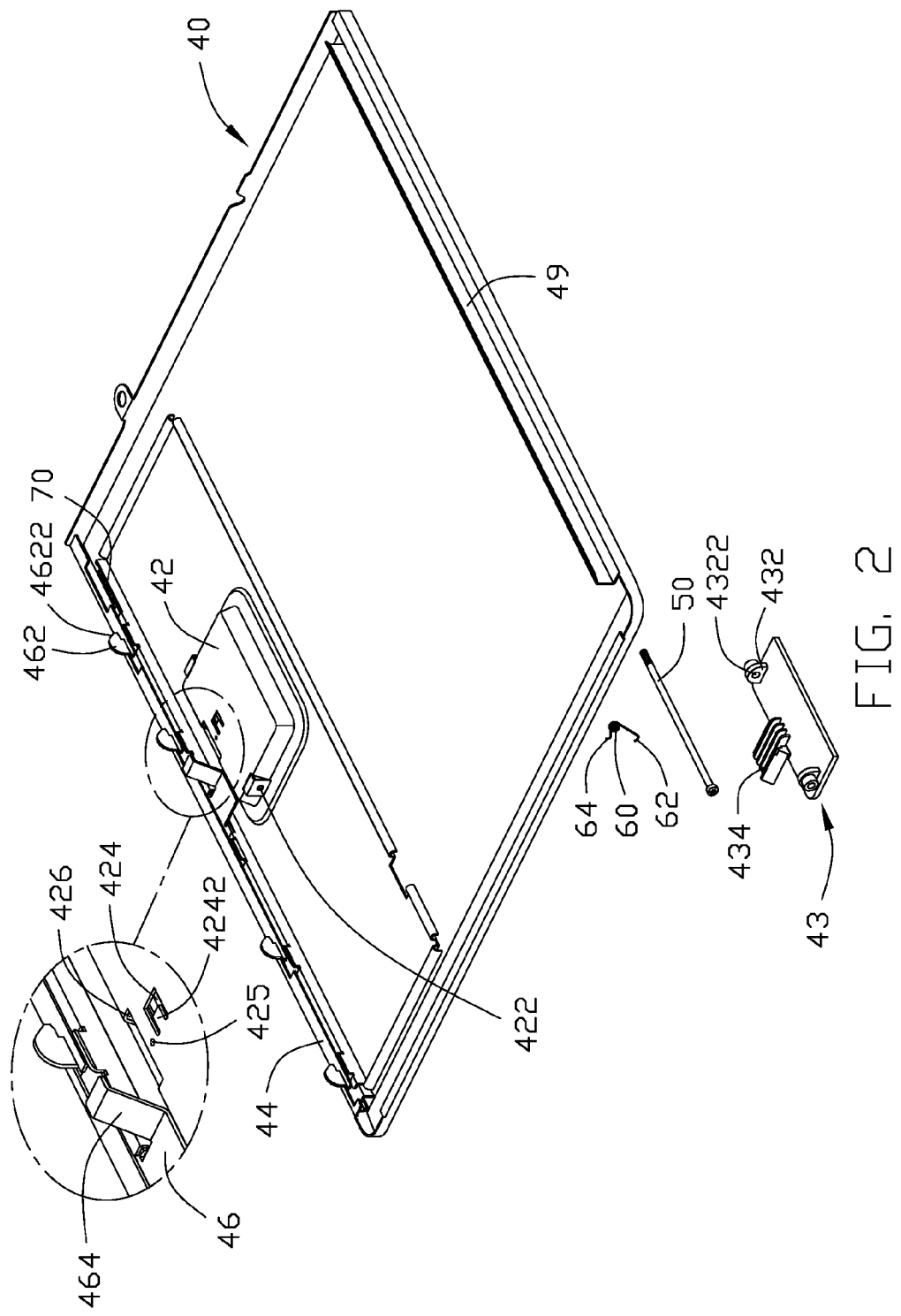
FIG. 2 is an exploded, isometric view of a cover of the computer enclosure.
Figure 6:
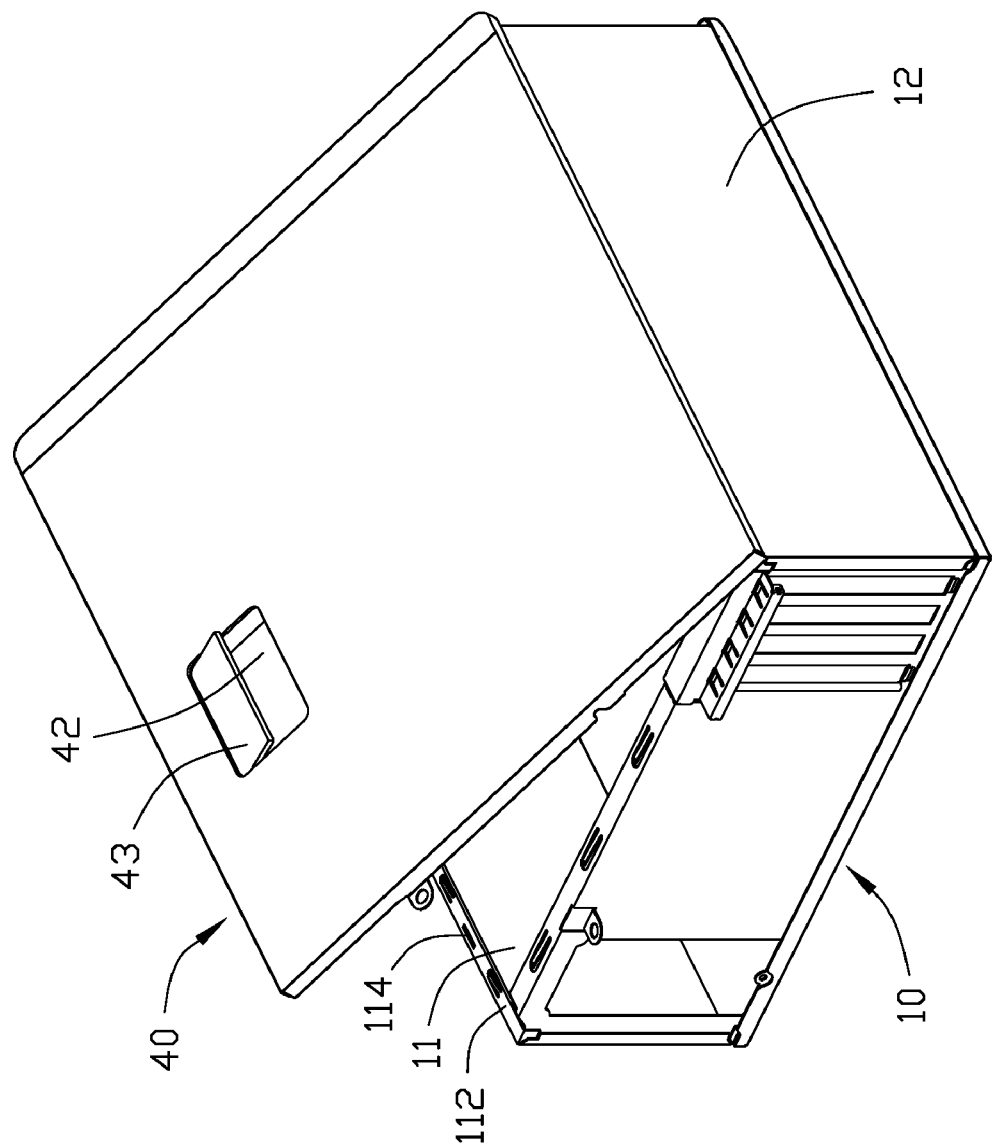
FIG. 6 is an assembled isometric view of the computer enclosure.

Referring to FIG. 1, FIG. 2 and FIG. 6, an embodiment of a computer enclosure includes a chassis 10 and a cover 40 detachably mounted thereon.

The chassis 10 includes side panels 11, 12, 13, 14. A first flange 112 extends from a top edge of the side panel 11, and a second flange 122 is extends from a top edge of the side panel 12. A plurality of assembly slots 114 is defined in the first flange 112.

Figure 4:
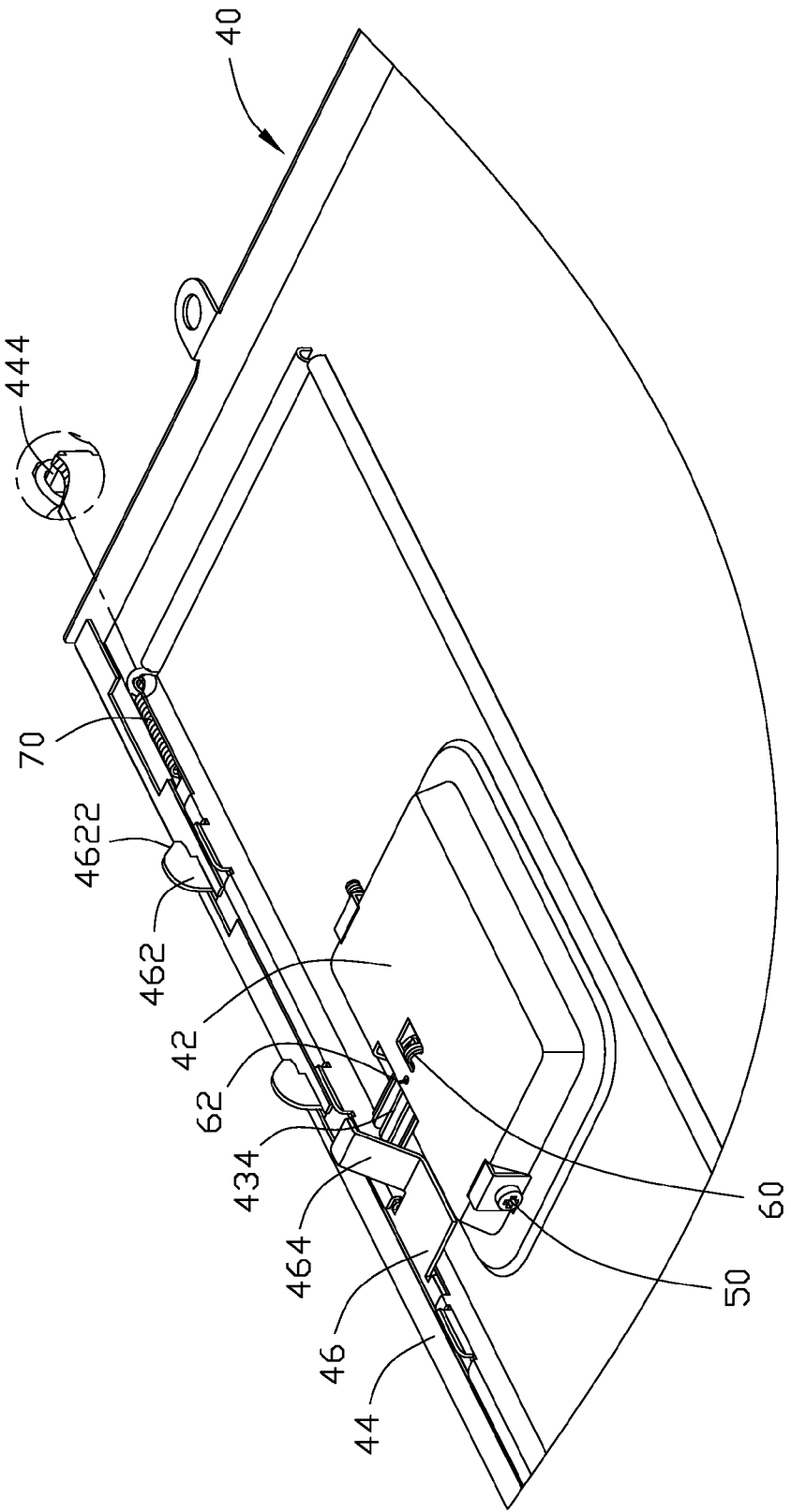
FIG. 4 is an assembled isometric view of FIG. 2.

The cover 40 includes a receiving portion 42 with two fixing holes 422. An opening 424 is defined in the receiving portion 42, and a locating hole 425 is defined in the receiving portion 42 adjacent to the opening 424. A through opening 426 is defined in one edge of the receiving portion 42. A locating piece 4242 protrudes from one edge of the opening 424. An elongate sliding channel 44 is defined on one edge of the cover 40 adjacent to the receiving portion 42, and a bent piece 49 is formed in another edge of the cover 40 corresponding to the second flange 122 of the chassis 10. Referring to FIG. 4, a first retaining portion 444 is disposed on one side of the sliding channel 44.

A rotary member 43 is received in the receiving portion 42 with two tabs 432 disposed on opposite sides thereof. A pivot hole 4322 is defined in each tab 432. A positioning block 434 protrudes from the rotary member 43 corresponding to the through opening 426 of the receiving portion 42.

Figure 3:
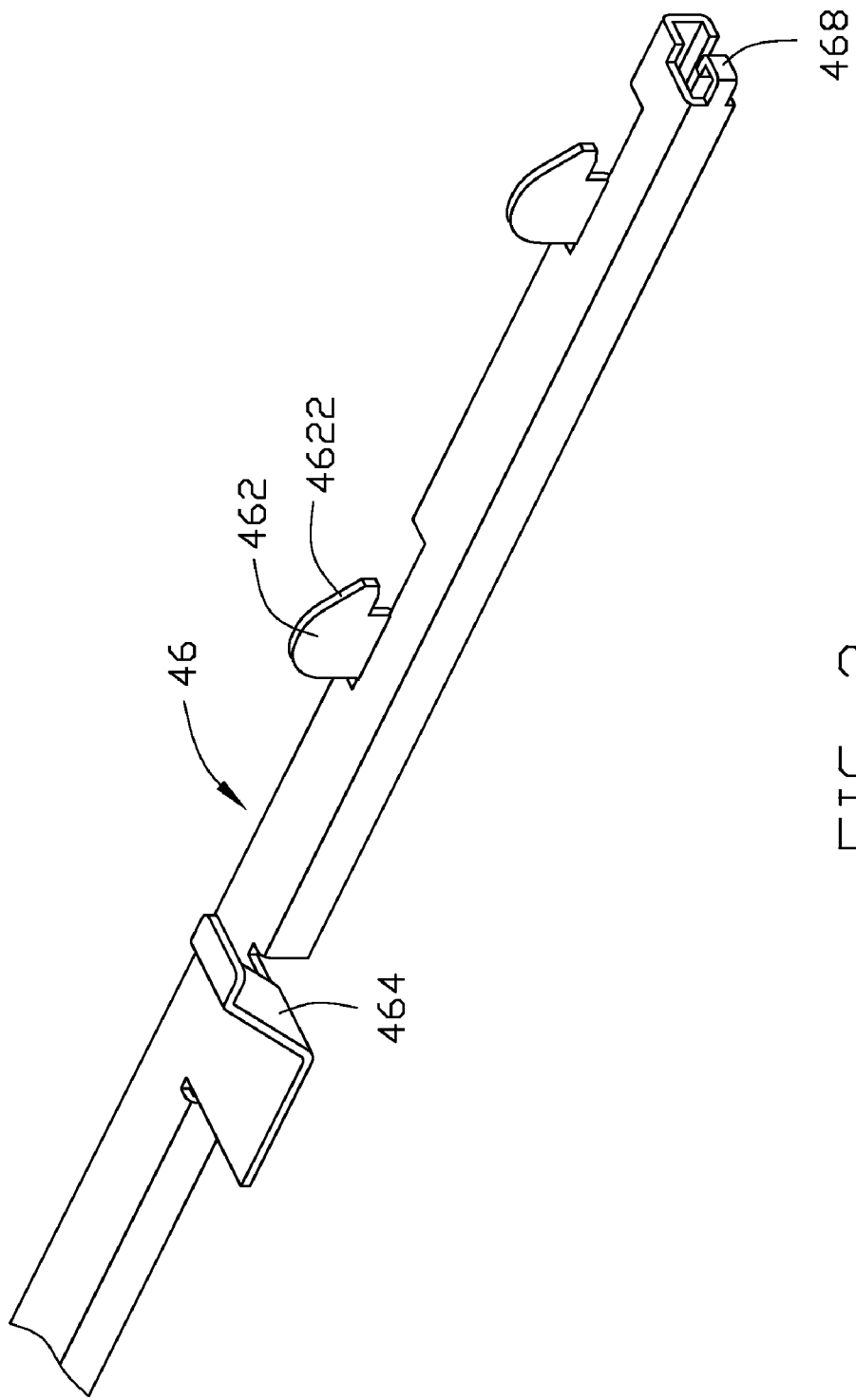
FIG. 3 is an isometric view of a sliding member of FIG. 2.

Referring to FIG. 3, a sliding member 46 is slidably received in the sliding channel 44. A plurality of hooks 462 protrudes from the sliding member 46 corresponding to the assembly slots 114 of the side panel 11. Each hook 462 includes an inclined edge 4622. An inclined piece 464 is disposed on the sliding member 46 adjacent to the through opening 426 of the receiving portion 42, engaging the positioning block 434 of the rotary member 43. A second retaining portion 468 is formed on one side of the sliding member 46.

A first resilient component 70 is installed on the cover 40. One end of the first resilient component 70 is connected to the first retaining portion 444 of the sliding channel 44, and the other end of the first resilient component 70 is connected to the second retaining portion 468 of the sliding member 46.

Figure 5:
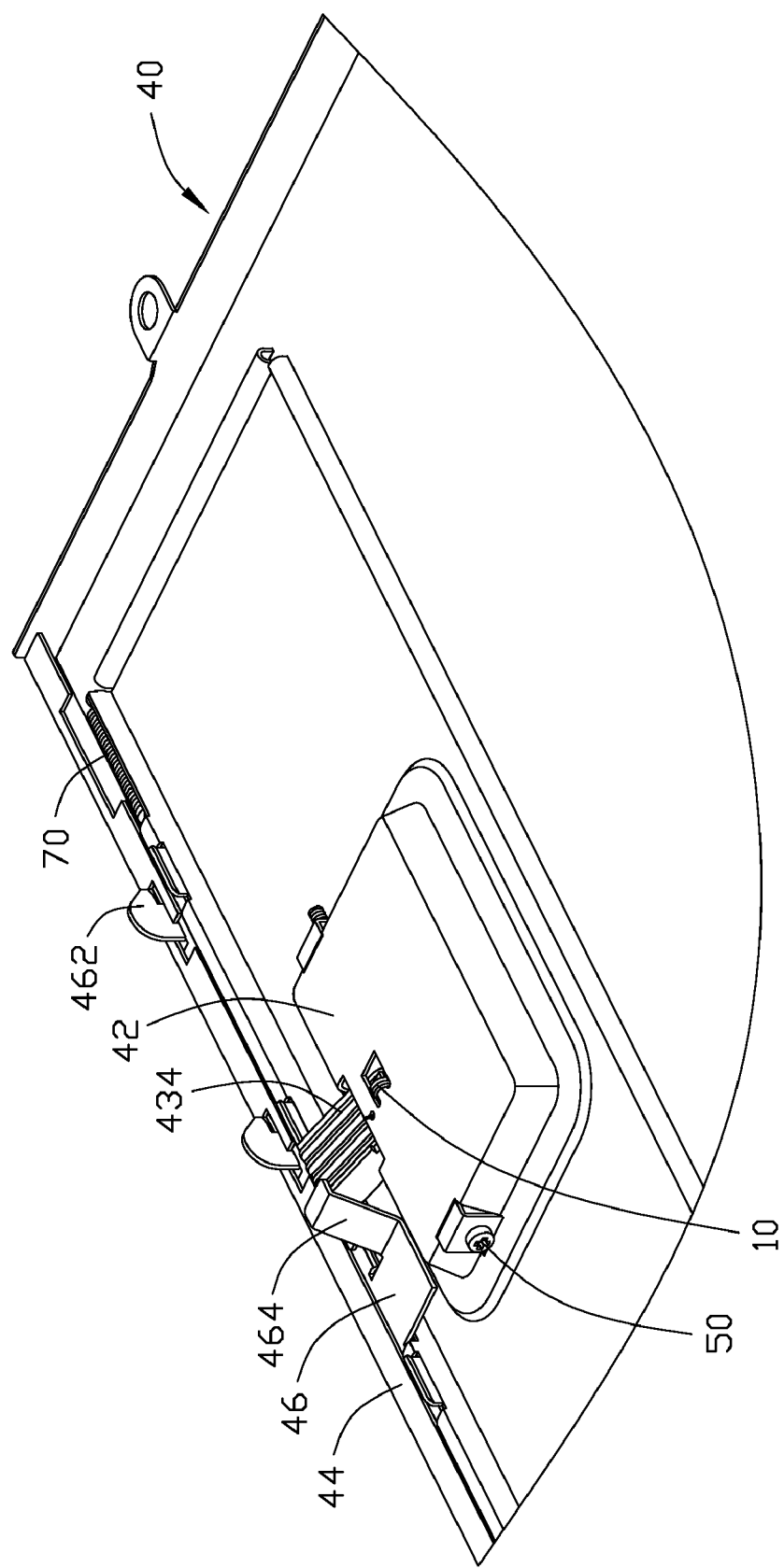
FIG. 5 is similar to FIG. 4, but shows the cover in another state.

Referring to FIG. 4 and FIG. 5, the rotary member 43 is placed in the receiving portion 42, and a pivot shaft 50 is received in the fixing holes 422 of the receiving portion 42 and the pivot holes 4322 of the rotary member 43. A second resilient component 60 is mounted on the cover 40 and placed around the locating piece 4242 of the receiving portion 42. The second resilient component 60 includes two protrusions 62, 64, with protrusion 62 received in the locating hole 425 of the receiving portion 42, and the protrusion 64 positioned between the receiving portion 42 and the rotary member 43. Thereby, the rotary member 43 is pivotally installed in the receiving portion 42. The positioning block 434 of the rotary member 43 passes through the through hole 426 of the receiving portion 42, and abuts the inclined piece 464 of the sliding member 46.

Referring from FIGS. 4 and 6, during assembly, the bent piece 49 of the cover 40 is secured to the second flange 122 of the side panel 12 of the chassis 10. The cover 40 rotates toward the chassis 10 at a connection between the bent piece 49 and the second flange 122 until the inclined edges 4622 of the hooks 462 of the sliding member 46 correspondingly abut the assembly slots 114 of the first flange 112. The cover 40 is pressed to drive the inclined edges 4622 of the hooks 462 against the assembly slots 114, and the sliding member 46 slides in the sliding channel 44 along a first direction away from the first retaining portion 444. The first resilient component 70 is deformed elastically and elongated. When the inclined edges 4622 of the hooks 462 run through the corresponding assembly slots 114, the first resilient component 70 returns to an original state. The sliding member 46 slides in the sliding channel 44 along a second direction opposite to the first direction until the hooks 462 are engaged in the corresponding assembly slots 114. The cover 40 is thus mounted to the chassis 10, and the inclined piece 464 of the sliding member 46 abuts the positioning block 434 of the rotary member 43.

For removal, the rotary member 43 is rotated, the positioning block 434 rotates along the rotary member 43 and abuts the inclined piece 464 of the sliding member 46, which slides along the first direction until the hooks 462 thereof disengage from the assembly slots 114 of the chassis 10. The first resilient component 70 is deformed elastically and elongated. The single movement of the rotary member 43 presses against the protrusion 64 of the second resilient component 60 and pulls the cover 40 away from chassis 10. When the hooks 462 disengage from the corresponding assembly slots 114, the cover 40 is removed from the chassis 10.

When the cover 40 is removed from the chassis 10, the rotary member 43 is released. The second resilient component 60 returns to an original state to rotate the rotary member 43 into the receiving portion 42. The first resilient component 70 returns to the original state to slide the sliding member 46 along the second direction until the inclined piece 464 is blocked by the positioning block 434 of the rotary member 43.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis comprising at least one assembly slot defined therein;
   a cover detachably mounted to the chassis, a sliding member being slidably installed in the cover, at least one hook being formed on the sliding member and engaged in the assembly slot of the chassis; and
   a rotary member pivotably attached to the cover about an axis, the rotary member capable of being rotated to drive the sliding member to slide in the cover along a first direction, thereby disengaging the hook from the assembly slot, wherein the axis is substantially parallel to the first direction;
   wherein the sliding member comprises an inclined piece, and wherein a positioning block protrudes from the rotary member and abuts the inclined piece, and when the rotary member is rotated, the positioning block contacts the inclined piece to slide the sliding member in the cover along the first direction for removal of the cover from the chassis.

2. The computer enclosure of claim 1, wherein a receiving portion is formed in the cover, in which a through opening is defined, the rotary member is pivotably received in the receiving portion, and the positioning block passes through the through opening to abut the inclined piece.

3. The computer enclosure of claim 2, further comprising a locating piece formed in the receiving portion; and a resilient component comprising two protrusions, one installed on the receiving portion, the other abutting the rotary member, and the resilient component is deformed elastically when the rotary member is rotated.

4. A computer enclosure, comprising:
   a chassis comprising at least one side panel on a top edge of which a flange is formed, wherein at least one assembly slot is defined in the flange;
   a cover detachably mounted to the chassis, in which a sliding member is installed, on which at least one hook and an inclined piece are formed, with a first resilient component being connected to the cover and the sliding member to retain the hook in the assembly slot; and
   a rotary member pivotably attached to the cover about an axis, the rotary member is adapted to rotate about the axis to drive the sliding member to slide along a first direction;
   wherein the axis is substantially parallel to the first direction wherein a positioning block protrudes from the rotary member and abuts the inclined piece, and when the rotary member is rotated, the positioning block contacts the inclined piece to slide the sliding member in the cover along the first direction for removal of the cover from the chassis.

5. The computer enclosure of claim 4, further comprising a first retaining portion, a second retaining portion disposed on the sliding member, wherein two ends of the first resilient component are correspondingly connected to the first and second retaining portions.

6. The computer enclosure of claim 5, wherein a receiving portion is formed in the cover, a through opening is defined in the receiving portion, the rotary member is pivotably received in the receiving portion, and the positioning block passes through the through opening to abut the inclined piece.

7. The computer enclosure of claim 6, wherein a locating piece is formed in the receiving portion for receiving a second resilient component, the second resilient component comprises one protrusion on the receiving portion and another protrusion abutting the rotary member, and the second resilient component is deformed elastically when the rotary member is rotated.

* * * * *